(12) United States Patent
Jin et al.

(10) Patent No.: US 9,129,399 B2
(45) Date of Patent: Sep. 8, 2015

(54) OPTICAL FLOW WITH NEAREST NEIGHBOR FIELD FUSION

(71) Applicant: Adobe Systems Incorporated, San Jose, CA (US)

(72) Inventors: Hailin Jin, San Jose, CA (US); Zhuoyuan Chen, Evanston, IL (US); Zhe Lin, Fremont, CA (US); Scott D. Cohen, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 288 days.

(21) Appl. No.: 13/794,300

(22) Filed: Mar. 11, 2013

(65) Prior Publication Data

US 2014/0254882 A1    Sep. 11, 2014

(51) Int. Cl.
*G06K 9/00* (2006.01)
*G06T 7/20* (2006.01)
*G06T 7/00* (2006.01)

(52) U.S. Cl.
CPC ............... *G06T 7/204* (2013.01); *G06T 7/003* (2013.01); *G06T 7/2006* (2013.01); *G06T 7/2013* (2013.01); *G06T 2207/20016* (2013.01); *G06T 2207/20021* (2013.01)

(58) Field of Classification Search
None
See application file for complete search history.

(56) References Cited

U.S. PATENT DOCUMENTS

| | | | |
|---|---|---|---|
| 5,351,095 A | 9/1994 | Kerdranvat | |
| 5,729,008 A * | 3/1998 | Blalock et al. | 250/208.1 |
| 5,749,073 A | 5/1998 | Slaney | |
| 7,711,180 B2 | 5/2010 | Ito et al. | |
| 8,205,148 B1 | 6/2012 | Sharpe et al. | |
| 8,290,294 B2 | 10/2012 | Kopf et al. | |
| 8,340,461 B2 | 12/2012 | Sun et al. | |
| 8,346,751 B1 | 1/2013 | Jin et al. | |
| 8,588,551 B2 | 11/2013 | Joshi et al. | |
| 8,675,962 B2 | 3/2014 | Mori et al. | |
| 9,025,822 B2 | 5/2015 | Jin et al. | |
| 9,031,345 B2 | 5/2015 | Jin et al. | |
| 2004/0218834 A1 | 11/2004 | Bishop et al. | |
| 2005/0069207 A1 | 3/2005 | Zakrzewski et al. | |
| 2006/0147087 A1 | 7/2006 | Goncalves et al. | |
| 2007/0242900 A1 | 10/2007 | Chen et al. | |

(Continued)

OTHER PUBLICATIONS

"Non-Final Office Action", U.S. Appl. No. 13/794,408, Sep. 10, 2014, 14 pages.

(Continued)

*Primary Examiner* — Bhavesh Mehta
*Assistant Examiner* — Oneal R Mistry
(74) *Attorney, Agent, or Firm* — Wolfe-SBMC

(57) ABSTRACT

In embodiments of optical flow with nearest neighbor field fusion, an initial motion field can be generated based on the apparent motion of objects between digital images, and the initial motion field accounts for small displacements of the object motion. Matching patches of a nearest neighbor field can also be determined for the digital images, where patches of an initial size are compared to determine the matching patches, and the nearest neighbor field accounts for large displacements of the object motion. Additionally, region patch matches can be compared and determined between the digital images, where the region patches are larger than the initial size matching patches. Optimal pixel assignments can then be determined for a fused image representation of the digital images, where the optimal pixel assignments are determined from the initial motion field, the matching patches, and the region patch matches.

20 Claims, 8 Drawing Sheets

(56) References Cited

U.S. PATENT DOCUMENTS

| | | | |
|---|---|---|---|
| 2007/0273653 A1* | 11/2007 | Chen et al. | 345/166 |
| 2007/0286497 A1* | 12/2007 | Podilchuk | 382/218 |
| 2008/0278584 A1 | 11/2008 | Shih et al. | |
| 2009/0110076 A1 | 4/2009 | Chen | |
| 2009/0297059 A1 | 12/2009 | Lee et al. | |
| 2010/0128789 A1 | 5/2010 | Sole et al. | |
| 2010/0272311 A1 | 10/2010 | Nir et al. | |
| 2011/0026596 A1 | 2/2011 | Hong | |
| 2011/0043603 A1 | 2/2011 | Schechner et al. | |
| 2011/0170784 A1 | 7/2011 | Tanaka et al. | |
| 2012/0027295 A1 | 2/2012 | Shao | |
| 2012/0105728 A1 | 5/2012 | Liu | |
| 2012/0134574 A1* | 5/2012 | Takahashi et al. | 382/154 |
| 2012/0151320 A1 | 6/2012 | McClements, IV | |
| 2013/0136364 A1* | 5/2013 | Kobayashi | 382/195 |
| 2013/0230247 A1 | 9/2013 | Schlosser et al. | |
| 2013/0235201 A1 | 9/2013 | Kiyohara et al. | |
| 2014/0133675 A1 | 5/2014 | King et al. | |
| 2014/0205141 A1* | 7/2014 | Gao et al. | 382/103 |
| 2014/0254881 A1 | 9/2014 | Jin | |
| 2014/0254933 A1 | 9/2014 | Jin | |
| 2014/0254943 A1 | 9/2014 | Jin | |

OTHER PUBLICATIONS

"Non-Final Office Action", U.S. Appl. No. 13/794,125, Oct. 24, 2014, 19 pages.

Zhang, et al.,' "Video Dehazing with Spatial and Temporal Coherence", The Visual Computer: International Journal of Computer Graphics—CGI'2011 Conference, vol. 27, Issue 6-8, Apr. 20, 2011, 9 pages.

Barnes, et al.,' "PatchMatch: A Randomized Correspondence Algorithm for Structural Image Editing", ACM SIGGRAPH 2009 Papers (New Orleans, Louisiana, Aug. 3-7, 2009), Aug. 3, 2009, 11 pages.

Barnes, et al.,' "The Generalized PatchMatch Correspondence Algorithm", European Conference on Computer Vision, Sep. 2010, Retrieved from <http://gfx.cs.princeton.edu/pubs/Barnes_2010_TGP/generalized_pm.pdf> on Sep. 9, 2010,Sep. 2010, 14 pages.

Brox, et al.,' "Large Displacement Optical Flow: Descriptor Matching in Variational Motion Estimation", IEEE Transactions on Pattern Analysis and Machine Intelligence, 2010, 2011, 14 pages.

Fattal, "Single Image Dehazing", presented at the ACM SIGGRAPH, Los Angeles, California, 2008., 9 pages.

He, et al.,' "Computing Nearest-Neighbor Fields via Propagation-Assisted KD-Trees", CVPR 2012, 8 pages.

He, et al.,' "Single Image Haze Removal Using Dark Channel Prior", In Computer Vision and Pattern Recognition, IEEE Conference on, 2009, 8 pages.

He, et al.,' "Statistics of Patch Offsets for Image Completion", ECCV 2012, 14 pages.

Korman, et al.,' "Coherency Sensitive Hashing", ICCV 2011, 8 pages.

Olonetsky, et al.,' "TreeCANN—k-d tree Coherence Approximate Nearest Neighbor algorithm", European Conference on Computer Vision, 2012, 14 pages.

Xu, et al.,' "Motion Detail Preserving Optical Flow Estimation", IEEE Transactions on Pattern Analysis and Machine Intelligence, 34(9), 2012, 8 pages.

Pattern Analysis and Machine Intelligence, 34(9), 2012, 2012, 8 pages.

"Corrected Notice of Allowance", U.S. Appl. No. 13/794,125, Apr. 9, 2015, 2 pages.

"Non-Final Office Action", U.S. Appl. No. 13/675,844, Dec. 19, 2014, 10 pages.

"Non-Final Office Action", U.S. Appl. No. 13/794,219, Feb. 12, 2015, 28 pages.

"Notice of Allowance", U.S. Appl. No. 13/794,125, Jan. 30, 2015, 7 pages.

"Notice of Allowance", U.S. Appl. No. 13/794,408, Feb. 4, 2015, 7 pages.

Dong, et al.,' "Adaptive Object Detection and Visibility Improvement in Foggy Image", Journal of Multimedia, vol. 6, No. 1 (2011), Feb. 14, 2011, 8 pages.

Wu, "Fish Detection in Underwater Video of Benthic Habitats in Virgin Islands", University of Miami, May 29, 2012, 72 pages.

"Supplemental Notice of Allowance", U.S. Appl. No. 13/794,408, Apr. 17, 2015, 2 pages.

"Notice of Allowance", U.S. Appl. No. 13/794,219, Jun. 3, 2015, 9 pages.

* cited by examiner

OPTICAL FLOW WITH NEAREST NEIGHBOR FIELD FUSION

BACKGROUND

Matching patches between two images, or between regions of the images, is also referred to as computing a nearest neighbor field and is a common technique used for image processing and computer graphics applications. Patches of an image may be compared as each pixel of the image, or may be a larger region of the image that includes a grid of multiple pixels. One technique for determining matching patches between two images is to exhaustively search for the best matching patch in one of the images for every patch in the other image. Although this technique is a simple algorithm, it is computationally expensive and time-consuming.

There are other more efficient algorithms that can be utilized to speed up the matching process, such as by utilizing a spatial constraint that adjacent patches in one image tend to have the same spatial relationship with the matching patches in the other image. However, these algorithms are directed to reconstructing one image from the other and often produce patch matches that are spatially incoherent, with the resulting nearest neighbor fields being based on reconstruction errors. Conventional techniques and algorithms to compute nearest neighbor fields between images do not enforce spatial coherency of the matching patches, and may not match a patch in one image to the respective, same patch in another image. For example, a white color patch in one image may be matched to any number of white color patches in another image without maintaining the spatial coherency of the actual corresponding patches in the two images.

Optical flow is the problem of inferring the apparent motion between images, and conventional algorithms for optical flow are utilized to compute a motion field, such as for optical flow registration, which is useful for image tracking, motion segmentation, and other motion processing applications. A nearest neighbor field typically provides only a very noisy estimate of the true optical flow field for the images. A motion field can be computed between two images, where the direction and magnitude of optical flow at each location is represented by the direction and length of arrows in the motion field. A motion determination between images can be utilized to track object motion, such as in video frames. For example, in a robotics application, cameras may capture two or more separate images of a scene and/or subject from slightly different perspectives and combine the separate images into one image to reduce or eliminate noise in the images. The noise effect will be different in each of the images, and the combined image is a smoothed combination of the separate images that reduces or eliminates the noise effect of each image.

Although optical flow algorithms can enforce the spatial coherency of pixels and/or patches between images, the conventional algorithms assume that the pixel motion of objects (e.g., object displacement) from one image to the next is very small. Further, optical flow registration algorithms that extract feature points do not provide a dense motion field of the images. Additionally, the conventional algorithms often produce incorrect results because they are initialized to start from an initial motion field that is typically set to zero everywhere, and therefore cannot account for a large motion between two images.

To account for large motions between images, techniques that utilize a coarse-to-fine framework are used, such as by running optical flow over an image pyramid and initializing the flow for the next most detailed level to be the up-sampled flow computed from the current coarser level. At each pyramid level, the flow is refined locally using a differential formulation that is valid only for small motions. Another conventional solution to account for large motions is to form a large discrete labeling problem, where labels at pixels represent 2D motion vectors and a dense sampling of the possible motions, including large motions, defines the label set. Another solution can be used to combine the results of a traditional continuous optical flow algorithm with a sparse flow defined by scale invariant feature transform (SIFT) matching. Matching SIFT features, or descriptors, can be extracted at each pixel and/or patch of an image to characterize image objects and encode contextual information of the pixels and/or matching patches.

However, each of these conventional solutions to account for large motions between images have limitations. For example, with the image pyramid solution, down-sampling the input images to create the pyramid removes details that are needed for accurate patch matching, particularly for small or thin objects. In fact, small or thin objects may be completely removed or become so obscured at a coarse level of the pyramid that it not possible for an optical flow algorithm to correctly match those areas at that level. The flow at a next, more detailed level of the pyramid is initialized to the upsampled flow from the coarser level. Because the flow is then updated with only small motion changes for local matching, the correct matches for small or thin areas will not be discovered in this next step if the correct flow is very different from the initial flow. This will be the case even if the details of the small or thin object are visible at this next most detailed level.

The image pyramid solution can provide sub-pixel level accuracy and capture motion boundaries, but is over smooth for small structures. The flow details of small or thin structures are often missed and the flow in those areas are typically computed as the flow of the surrounding background. Using nearest neighbor fields that match patches independently at the desired output resolution can capture fine details of the flow, handle large motions, and be computed quickly. However, using nearest neighbor fields does not provide the fine sub-pixel accuracy, returns poor flows for patches containing motion boundaries (e.g., because there is actually more than one motion present), and does not match repetitive patterns and textureless regions very well due to the ambiguity of matching and the lack of a global optimization formulation with smoothness to resolve these ambiguities.

The large discrete labeling solution avoids the problem of working on down-sampled images to compute large motions by considering a large set of discrete motions at each pixel that can account for the largest motion present. The difficulty, however, is that it can lead to large labeling problems which require a very long computation time to solve. For example, to account for just ten pixels of motion in a direction up, down, left, or right, and if only integer motions are considered, the solution would require 441 labels (i.e., 21×21) for v=(dx,dy), where both dx and dy are $-10, -9, \ldots, -1, 0, 1, \ldots, 9, 10$. This also illustrates that the solution restricts the accuracy of the flow solution to a discrete set of possibilities. Sub-pixel accuracy can be obtained by considering more labels, but this leads to even larger labeling problems that quickly become impractical to solve. For example, to determine accuracy to 0.25 pixels in the previous example, both dx and dy would need to be considered for $-10, -9.75, -9.50, -9.25, -0.9, -8.75, \ldots, 9, 9.25, 9.5, 9.75, 10$. This would require 6561 labels (i.e., 81×81), which is approximately fifteen times more labels than when just using the integer flows.

The solution to combine the results of a traditional continuous optical flow algorithm with a sparse flow defined by SIFT matching avoids the large set of potential labels as described in the solution above, while obtaining potentially large motion matches for some pixels in the input images. However, SIFT matching can only provide a sparse flow, and the difficult problem remains of how to interpolate the flow in areas where the SIFT features are not detected. Additionally, SIFT feature matching is not effective for repetitive patterns and deforming objects in the input images.

SUMMARY

This Summary introduces features and concepts of optical flow with nearest neighbor field fusion, which is further described below in the Detailed Description and/or shown in the Figures. This Summary should not be considered to describe essential features of the claimed subject matter, nor used to determine or limit the scope of the claimed subject matter.

Optical flow with nearest neighbor field fusion is described. An initial motion field can be generated based on the apparent motion of objects between digital images, and the initial motion field accounts for small displacements of the object motion. Matching patches of a nearest neighbor field can also be determined for the digital images, where patches of an initial size are compared to determine the matching patches, and the nearest neighbor field accounts for large displacements of the object motion. Additionally, region patch matches can be compared and determined between the digital images, where the region patches are larger than the initial size matching patches. Optimal pixel assignments can then be determined for a fused image representation of the digital images, where the optimal pixel assignments are determined from the initial motion field, the matching patches, and the region patch matches.

In embodiments, the fused image representation of the digital images reflects both the large and small displacements of the apparent motion of the objects between the digital images. The optimal pixel assignment at each pixel location of the fused image representation can be determined based on multiple labels that correspond to a pixel location. The multiple labels include the initial motion field at the pixel location, a matching patch at the pixel location, and one or more of the region patch matches that encompass the pixel location. Further, the optimal pixel assignments are determined based on minimizing an energy function that assigns an optimal pixel selected based on the multiple labels that correspond to a pixel location.

BRIEF DESCRIPTION OF THE DRAWINGS

Embodiments of optical flow with nearest neighbor field fusion are described with reference to the following Figures. The same numbers may be used throughout to reference like features and components that are shown in the Figures.

DETAILED DESCRIPTION

Embodiments of optical flow with nearest neighbor field fusion are described and may be implemented by any type of device that supports image processing, such as a computer, a server, or other type of processing device. An image processing application includes an optical flow algorithm that generates an initial motion field based on the apparent motion of objects between digital images. A nearest neighbor field algorithm of the image processing application determines matching patches of a nearest neighbor field for the digital images. Image patches of an initial size are compared to determine the matching patches. Additionally, region patch matches can be compared and determined between the digital images, where the region patches are larger than the initial size matching patches. A fusion algorithm of the image processing application then determines optimal pixel assignments for a fused image representation of the digital images, where the optimal pixel assignments are determined from the initial motion field, the matching patches, and the region patch matches.

The initial motion field accounts for small displacements of the object motion between the digital images, and the matching patches and region patch matches of the nearest neighbor field accounts for large displacements of the object motion between the digital images. The fused image representation of the digital images reflects both the large and small displacements of the apparent motion of the objects between the digital images. The fusion algorithm fuses optical flow results that use local matching with dense nearest neighbor fields that use global matching, which accounts for digital images with large motions and small structures while avoiding the disadvantages of the conventional optical flow algorithms as described above. The fusion algorithm can determine the correct flow of small objects and/or areas in the presence of large motions by utilizing global matching to compute nearest neighbor fields. The fusion algorithm also utilizes continuous, small motion optical flow to provide sub-pixel accuracy with the correct smoothness within objects, and to provide the correct motion discontinuities between objects.

While features and concepts of optical flow with nearest neighbor field fusion can be implemented in any number of different devices, systems, networks, environments, and/or configurations, embodiments of optical flow with nearest neighbor field fusion are described in the context of the following example devices, systems, and methods.

Figure 1:
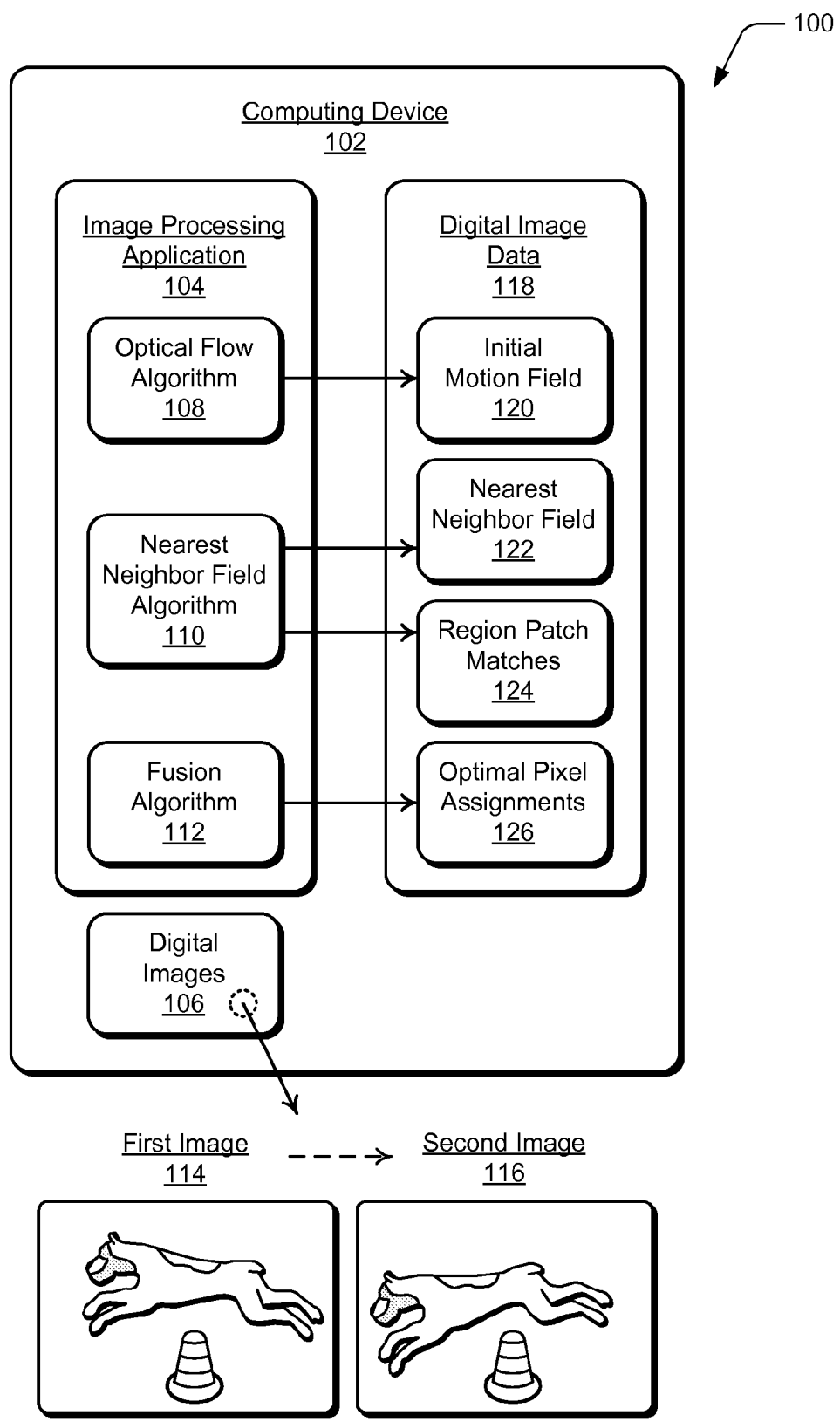
FIG. 1 illustrates an example system in which embodiments of optical flow with nearest neighbor field fusion can be implemented.

FIG. 1 illustrates an example system 100 in which embodiments of optical flow with nearest neighbor field fusion can be implemented. The system 100 includes an example computing device 102 that includes an image processing application 104, which may implement various algorithms to process digital images 106. The example device may be any type of computer and/or processing device, and can be implemented with various components, such as a processing system and memory, as well as with any number and combination of differing components as further described with reference to the example device shown in FIG. 8.

In this example system, the image processing application 104 includes an optical flow algorithm 108, a nearest neighbor field algorithm 110, and a fusion algorithm 112 to implement embodiments of optical flow with nearest neighbor field fusion. Although shown and described as separate algorithms of the image processing application, any one or more of the algorithms may be implemented together and/or independent of the image processing application. Alternatively, the image processing application 104 may be implemented without the algorithms, yet generally be implemented to perform the functions and operations of the algorithms.

The image processing application 104 and the various algorithms can be implemented as a software application, modules, or components for image processing, and can be maintained at the computing device 102 as executable instructions that are stored on computer-readable storage media, such as any suitable memory device or electronic data storage. Additionally, the image processing application 104 and algorithms can be executed with a processing system of the computing device 102 to implement embodiments of optical flow with nearest neighbor field fusion.

The digital images 106 can include any type of images, such as two video frames that are consecutive or close together in time. Consecutive images will typically include subject matter that overlaps, such as the background of the images, and objects that may be moving in the foreground. The apparent motion of an object, as represented by the displacement from one image to the next, may be a short distance in the images. Alternatively or in addition, the camera itself may move to capture a slightly different angle of the object, which gives the appearance of object motion from one image to the next. In some instances, an object may move a longer distance from one image to the next, such as when a car passes in front of the camera. Additionally, an object and/or the camera may rotate while the images are captured, which lends to high-order motions that include rotation motions and similarity, affine, and projective transformations.

In the examples described herein for optical flow with nearest neighbor field fusion, the digital images 106 are referenced as a first image 114 and a second image 116 that illustrate the motion of a dog jumping over an object. For example, in the first image 114, the dog is shown at the height of his jump over the object and, in the second image 116, the motion of the dog is shown to continue finishing the jump. The first and second digital images are described merely for illustrative purposes, and it should be noted that aspects of optical flow with nearest neighbor field fusion can be expanded and applied to any number of digital images.

In embodiments, the image processing application 104 (and/or the algorithms of the image processing application) are described as creating, generating, determining, and/or modifying various digital image data 118 for optical flow with nearest neighbor field fusion. The details of the image processing application and/or algorithms interaction with the various digital image data are described and illustrated in examples of the first and second images 114, 116 with reference to FIGS. 2-5.

Generally, the optical flow algorithm 108 of the image processing application 104 is implemented to generate an initial motion field 120 based on apparent motion of objects (e.g., the dog) between the digital images. An example of an initial motion field is described and illustrated with reference to FIG. 2. The nearest neighbor field algorithm 110 of the image processing application 104 is implemented to determine matching patches of a nearest neighbor field 122 for the first and second images 114, 116. Image patches of an initial size are compared to determine the matching patches of the digital images. An example of the matching patches of a nearest neighbor field for the digital images is described and illustrated with reference to FIG. 3.

The nearest neighbor field algorithm 110 is also implemented to determine region patch matches 124 between the digital images, where the region patches are larger than the initial size matching patches. An example of the region patch matches of the nearest neighbor field for the digital images is described and illustrated with reference to FIG. 4. The fusion algorithm 112 of the image processing application 104 is implemented to determine optimal pixel assignments 126 for a fused image representation of the digital images, where the optimal pixel assignments are determined from the initial motion field 120, the matching patches of the nearest neighbor field 122, and the region patch matches 124. An example of the fused image representation with optimal pixel assignments is described and illustrated with reference to FIG. 5.

Figure 2:
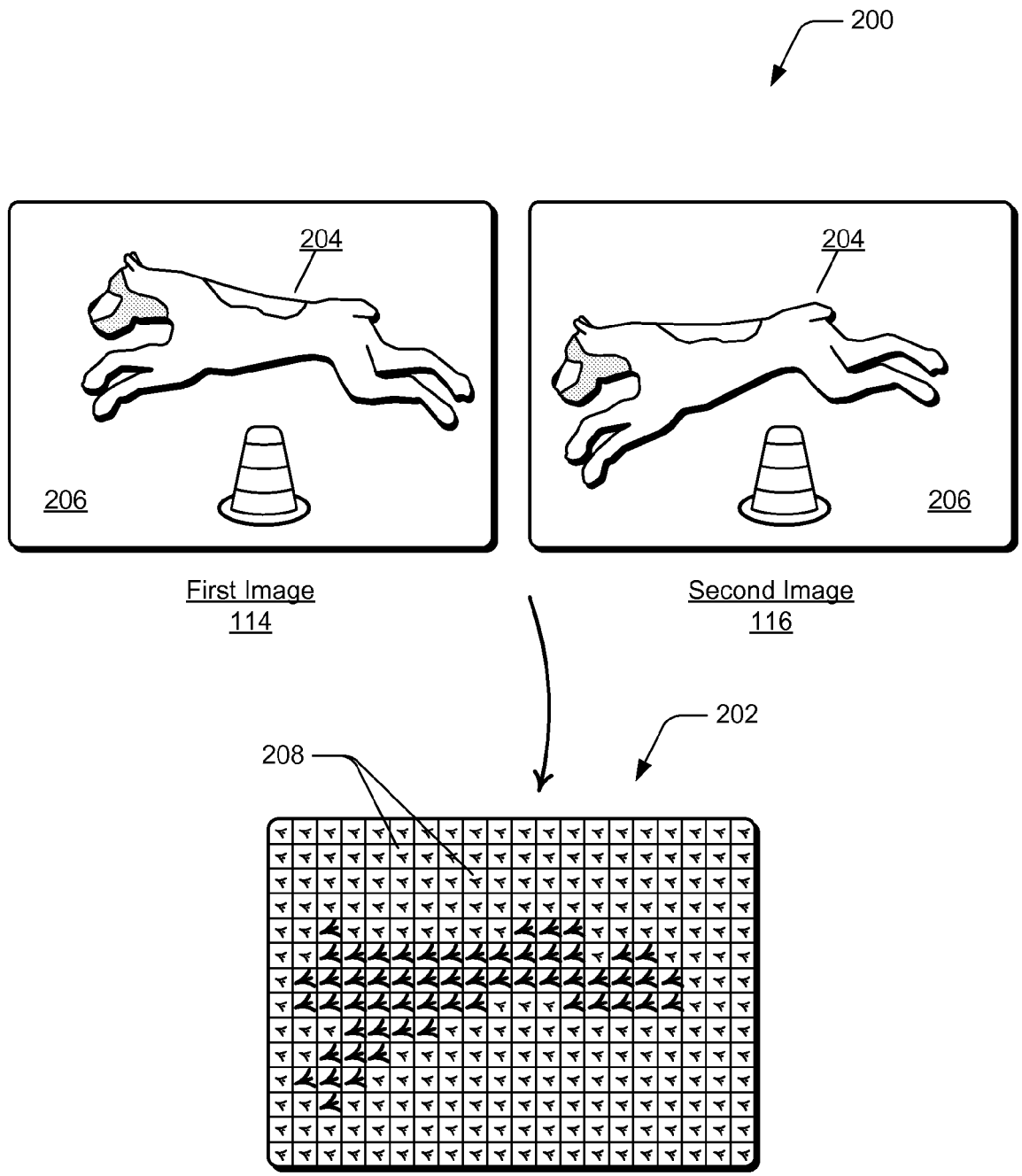
FIG. 2 illustrates an example of an initial motion field for digital images in accordance with one or more embodiments.

FIG. 2 illustrates an example 200 of an initial motion field 202 generated by the optical flow algorithm 108 of the image processing application 104 based on the apparent motion of objects between the first and second images 114, 116, such as the motion of the dog 204 and the lack of motion of the background 206. Motion data of the apparent motion of the objects between the digital images includes vectors that define the motion field. For a point $p_o$ on an object that moves with a velocity $v_o$, then the imaged point $p_i$ can be assigned a vector $v_i$ to indicate its 2D translation movement on a plane of an image. The initial motion field 202 is computed between the first and second images 114, 116, and the direction and magnitude of optical flow at each pixel and/or patch location is represented by the direction and length of arrows 208 in the motion field.

Figure 3:
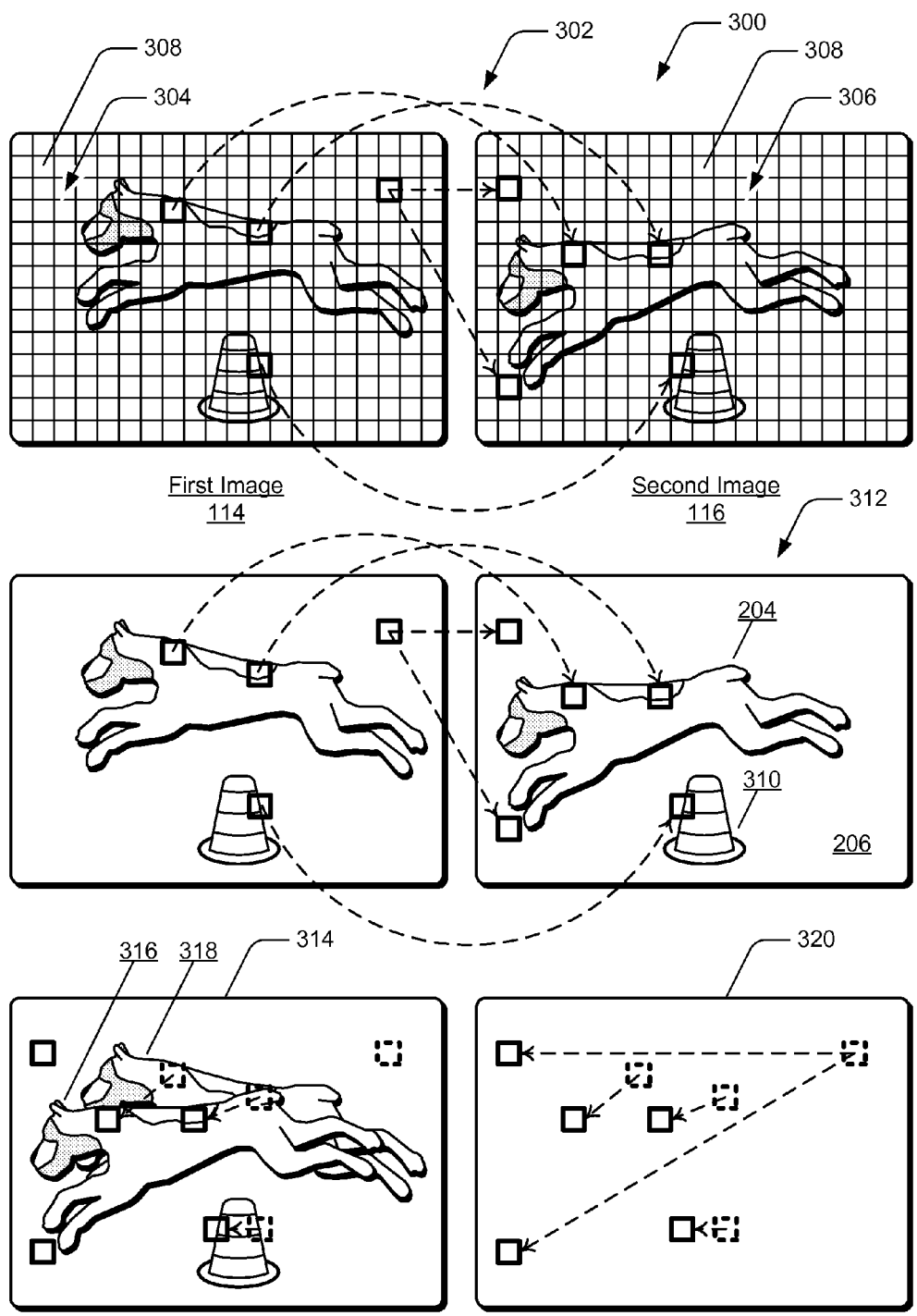
FIG. 3 illustrates an example of matching patches of a nearest neighbor field for digital images in accordance with one or more embodiments.

FIG. 3 illustrates an example 300 of matching patches 302 of the nearest neighbor field 122 for the first image 114 and the second image 116 (described with reference to FIG. 1). The image processing application 104 can create an image grid 304 of the first image 114, and create an image grid 306 of the second image 116. Each block or region of the image grids are representative of image patches 308, which can each be individual pixels, or larger regions that include multiple pixels. The nearest neighbor field algorithm 110 of the image processing application 104 is implemented to compare the image patches in the first image grid 304 and the second image grid 306 to determine the matching patches 302 at the image grid locations of the first and second images.

Patches of a digital image may be considered as each pixel of the image, or may be a larger region of the image that includes a grid of multiple pixels. A patch of several pixels will typically have more colors and other visual characteristics that make the patch less ambiguous, and likely easier to match for spatial coherency between images. The visual characteristics of a patch can include colors, shading, boundaries, and object features that can be detected to match patches for digital images. For example, a mostly black car may move as represented from one image to the next, and although many of the patches in the two images may be matching based on the black color of the car, the physically corresponding, spatially coherent patches may be different than the many other black colored patches due to shading, lighting, and/or other visual variations in the images, boundaries, and object shapes.

A relatively small patch (such as a 3×3 or 5×5 pixel region) can be used to determine object deformations to track object movement from one image to the next. While smaller patches may be better for accurate location determinations, such as for spatial coherency of an image patch from one image to another, larger patches can be utilized to avoid repetitive pattern matching. For example, a background of one common color, a wall, a fence, or other repetitive object pattern in the images will cause matching patches without spatial coherency from one image to the next. Although the smaller matching patches may be an accurate representation of the visual characteristics, the smaller matching patches may not physically correspond from one image to the next. Larger patches are likely to include visual characteristics of the images that are not repetitive, and the additional subject matter can be easier to match in the digital images.

The nearest neighbor field algorithm 110 of the image processing application 104 can be implemented with any number of various algorithms and techniques, including but not limited to, searching for the best matching patch in one image for every corresponding patch in the other image; utilizing a spatial constraint for a more efficient matching speed; and/or implementing the Principal Component Analysis or the Walsh-Hadamard Transform to compress the patches.

Examples of the matching patches 302 are shown in the image grids 304, 306 for the respective first and second images 114, 116. For example, two matching patches on the dog 204 in the second image 116 are matched to respective patches on the dog in the first image 114. Similarly, a matching patch that includes part of the object 310 (e.g., a cone that the dog jumps over) in the second image 116 is matched to a patch in the first image 114. The matching patches of the cone object illustrate that, although matching patches of the first and second images may include the visual subject matter and characteristics of each patch, the matching patches may not physically correspond from one image to the next. For example, the physically corresponding matching patch of the object in the second image 116 is to a patch on the other side of the object 310 in the first image 114.

Additionally, two matching patches of the background 206 in the second image 116 are matched to a single patch in the first image 114. The matching patches of the background illustrate that patches in one image may be initially matched to any number of matching patches in the other image. Further, as with the matching patches of the cone object, the initial matching patches of the background are also not spatially coherent and do not physically correspond in location from one mage to the next.

The first image 114 and the second image 116 are also shown for illustrative purposes at 312 without the image grids. A superimposed image 314 shows the motion position 316 of the dog 204 in the second image 116 relative to the motion position 318 of the dog in the first image 114 to illustrate the displacement of the example matching patches. In the superimposed image 314, the matching patches of the first image 114 are shown as the dashed-line border patches and the matching patches of the second image 116 are shown as the solid-line border patches. Another example superimposed image 320 illustrates the displacement of the example matching patches for the first and second images with the objects (e.g., the dog and the cone) removed from the image. Again, the matching patches of the first image 114 are shown as the dashed-line border patches and the matching patches of the second image 116 are shown as the solid-line border patches.

Figure 4:
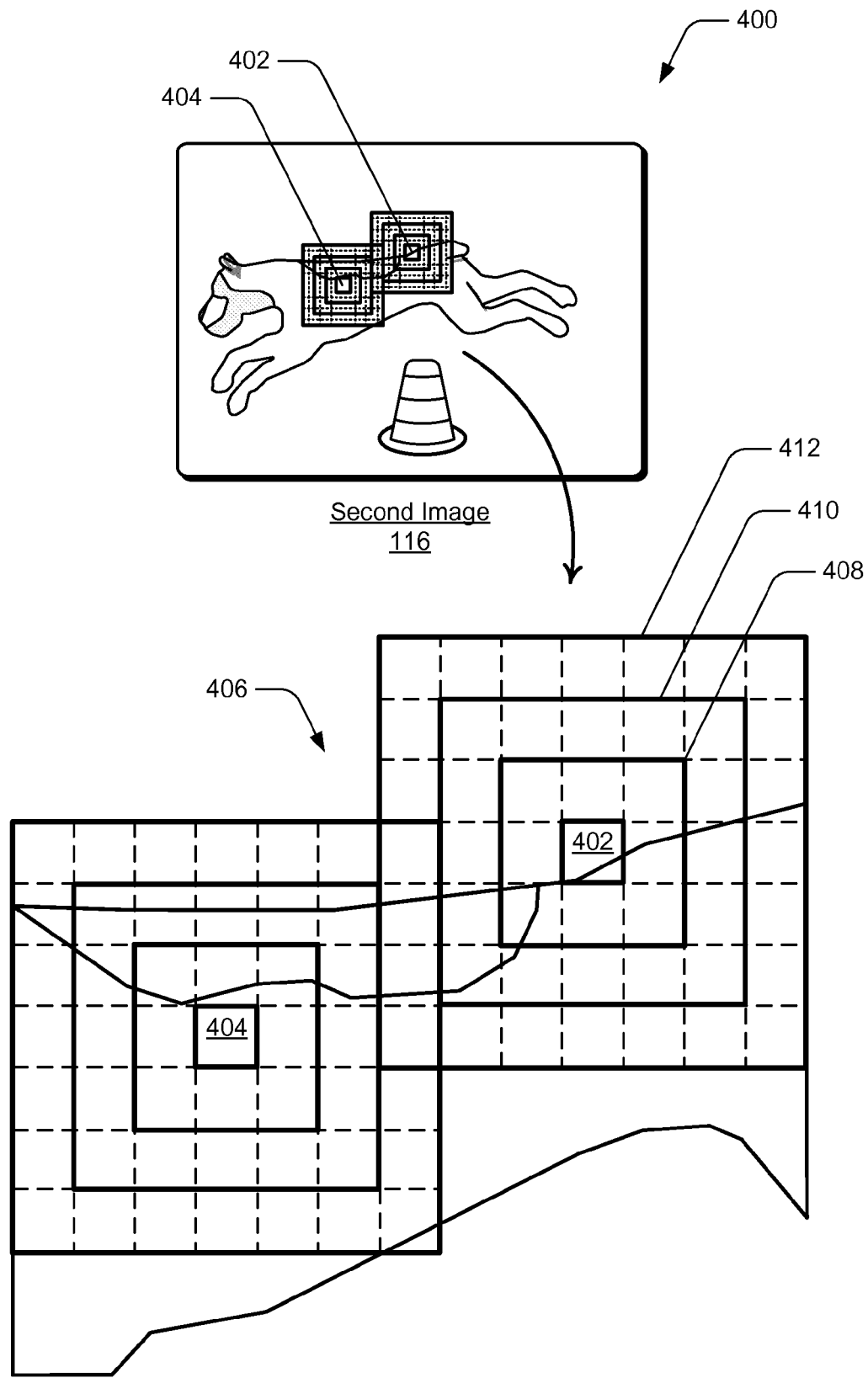
FIG. 4. illustrates an example of region patch matches between digital images in accordance with one or more embodiments.

FIG. 4 illustrates an example 400 of region patch matches 124 between the digital images 114, 116 determined by the nearest neighbor field algorithm 110 of the image processing application 104 as described with reference to FIG. 1. Initial matching patches 402, 404 are shown, as well as other different sizes (e.g., 3×3, 5×5, 7×7, etc.) of region patches 406 that are larger than the initial size matching patches of the nearest neighbor field. For example, a 3×3 region patch 408, a 5×5 region patch 410, and a 7×7 region patch 412 encompass the initial size matching patch 402. Each of the region patches 406 include some number of pixels and/or matching patches, and increasingly larger region patches encompass smaller region patches with reference to the matching patch that all of the region patches encompass. Although only three region patches of the particular region sizes are illustrated and described for each of the initial size matching patches, any number of region patches of any designated region sizes can be implemented.

Figure 5:
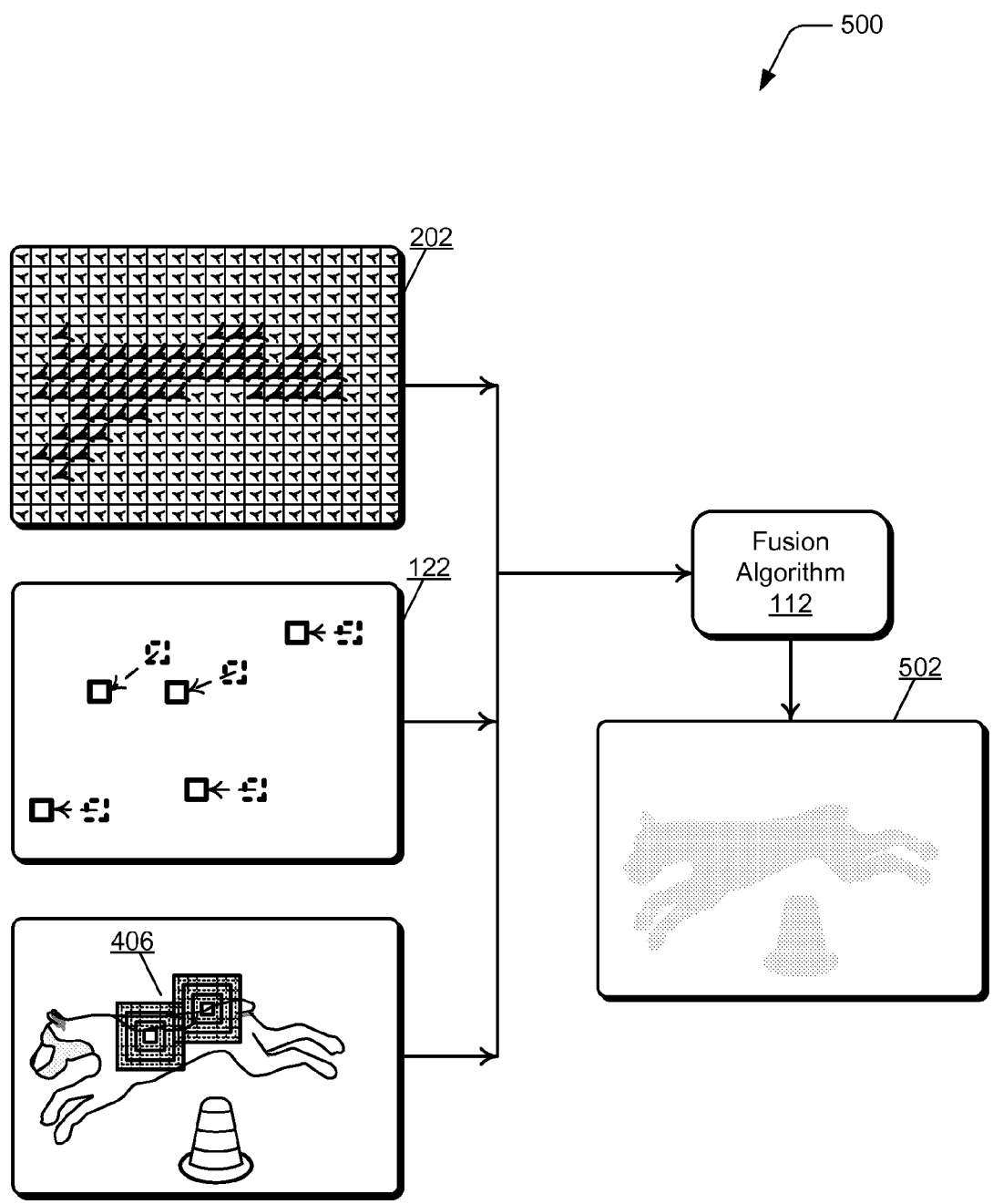
FIG. 5 illustrates an example of a fused image representation of the digital images with optimal pixel assignments as determined in accordance with one or more embodiments.

FIG. 5 illustrates an example 500 of a fused image representation 502 of the digital images in embodiments of optical flow with nearest neighbor field fusion. In this example, the fusion algorithm 112 of the image processing application 104 determines the optimal pixel assignments 126 for the fused image representation of the digital images as described with reference to FIG. 1. The fusion algorithm 112 is implemented to determine the optimal pixel assignments from the initial motion field 120 (e.g., also shown as example motion field 202), the matching patches 302 of the nearest neighbor field 122, and the region patch matches 124 (e.g., also shown as example region patches 406).

The optimal pixel assignments are determined based on minimizing an energy function that assigns an optimal pixel selected based on multiple labels that correspond to a pixel location. An optimal pixel assignment at each of the pixel locations of the fused image representation is based on the multiple labels that correspond to the pixel location, where the multiple labels include the initial motion field at the pixel location, a matching patch at the pixel location, and one or more of the region patch matches that encompass the pixel location.

The optical flow algorithm 108 of the image processing application 104 at the computing device 102 (FIG. 1) computes the optical flow from the first input image 114 to the second input image 116 to generate the initial motion field 120. The optical flow field $(u\_0, v\_0)$ from the first image to the second image can be computed with a continuous optical flow algorithm, which provides a candidate flow vector $(u\_0[p], v\_0[p])$ at each pixel p for the digital images.

The nearest neighbor field algorithm 110 of the image processing application 104 at the computing device 102 generates the nearest neighbor field 122 and the region patch matches 124. For a variable S that is a set of patch sizes (for example, S={3×3, 5×5, 7×7}, si is the i_th patch size (for example s1 is 3 pixels×3 pixels) and I1[s,p] denotes the image patch in the first image that is centered at p with patch size s. For each patch size si in S (i=1, . . . , m=|S|), the nearest neighbor field is computed for the first image for all pixels p: $(u\_i[p], v\_i[p]) := \min\_{\{all\ possible\ (u,v)\}} patch\_distance I1[si,p], I2[si, p+(u,v)])$. This provides the (1+m) flow candidates $(u\_0[p], v\_0[p])$, $(u\_1[p], v\_1[p])$, $(u\_2[p], v\_2[p])$, . . . , $(u\_m[p], v\_m[p])$, where the first candidate $(u\_0[p], v\_0[p])$ is determined from the optical flow algorithm as described above, and the last m candidates are determined from the nearest neighbor fields for different patch sizes.

The patch distance patch_distance(I1[si,p],I2[si,p+(u,v)]) may be a sum of squared distances between the colors at corresponding patch pixels in the first and second images. Other image difference measures may also be used, such as the sum of the L1 distances between colors at corresponding patch pixels. Further, the nearest neighbor field algorithm may be an algorithm that provides an approximate nearest neighbor field, such as PatchMatch, Coherency Sensitive Hashing (CSH), and propagation assisted Kd-tree.

The fusion algorithm 112 of the image processing application 104 at the computing device 102 then solves the labeling problem that assigns a single candidate flow (e.g., optimal pixel assignment from the m+1 candidates computed above) to each pixel p by minimizing an energy function. An image labeling L provides a label Lp to each pixel p, where Lp is in {0, 1, . . . , m}. If pixel p is labeled Lp, then the flow at that pixel is from the Lp_th flow (u_Lp[p],v_Lp[p]). Thus a labeling L defines a flow U(L) over the whole image and the algorithm solves for the labeling L that provides a flow U(L) that minimizes the following energy function:

$$E(L) = \text{sum\_\{pixels } p\} \|I1[p] - I2[p + (u\_Lp[p], v\_Lp[p])]\|\_1 +$$
$$\text{sum\_\{pixels } p\}\|\text{gradient}(u\_Lp[p])\|\_1 +$$
$$\text{sum\_\{pixels } p\}\|\text{gradient}(v\_Lp[p])\|\_1$$

The first term of the energy function is a data term, and the combined second and third terms are a smoothness term. The smoothness term at pixel p depends on the gradient of the flow field U(L) at p, and therefore involves the flow field at p and the neighbors of p in order to estimate the flow field derivatives in the x and y directions. If L* is the computed labeling, them the output flow field is {(u_L*p[p],v_L*p[p])}_p. In implementations, the fusion algorithm utilizes QPBO (quadratic pseudoboolean optimization) to determine the optimal pixel assignments for the fused image representation of the digital images. Alternatively, other labeling problem algorithms may be utilized, such as belief propagation.

As described above, the optical flow algorithm 108 provides one local matching candidate at each pixel (labeled (u_0,v_0) above). Alternatively, more than one optical flow algorithm can be utilized that assumes small motion (in a pyramid or not) to provide more than one local matching flow candidate for the fusion algorithm. Also, as described, m global matching flow candidates are generated by computing a nearest neighbor field for each of m different patch sizes. Alternatively, more global matching candidates may be generated for the fusion algorithm, such as by use of more than just the single nearest patch for each patch in the first image. For example, a factor of K nearest neighbors for m different patch sizes can be considered, which would then provide mK global matching candidates for the fusion algorithm. The K nearest patches can be computed with a simple patch_distance measure to select the K global matching candidates. If the patches are bunched up in a single area, the criterion can be changed to find the K patches that are close in color to the patch in the first image, but are somewhat spread out in their locations in the second image.

Example methods 600 and 700 are described with reference to FIGS. 6 and 7 in accordance with one or more embodiments of optical flow with nearest neighbor field fusion. Generally, any of the services, components, modules, methods, and operations described herein can be implemented using software, firmware, hardware (e.g., fixed logic circuitry), manual processing, or any combination thereof. Example methods may be described in the general context of executable instructions stored on computer-readable storage media that is local and/or remote to a computer processing system, and implementations can include software applications, programs, functions, and the like.

Figure 6:
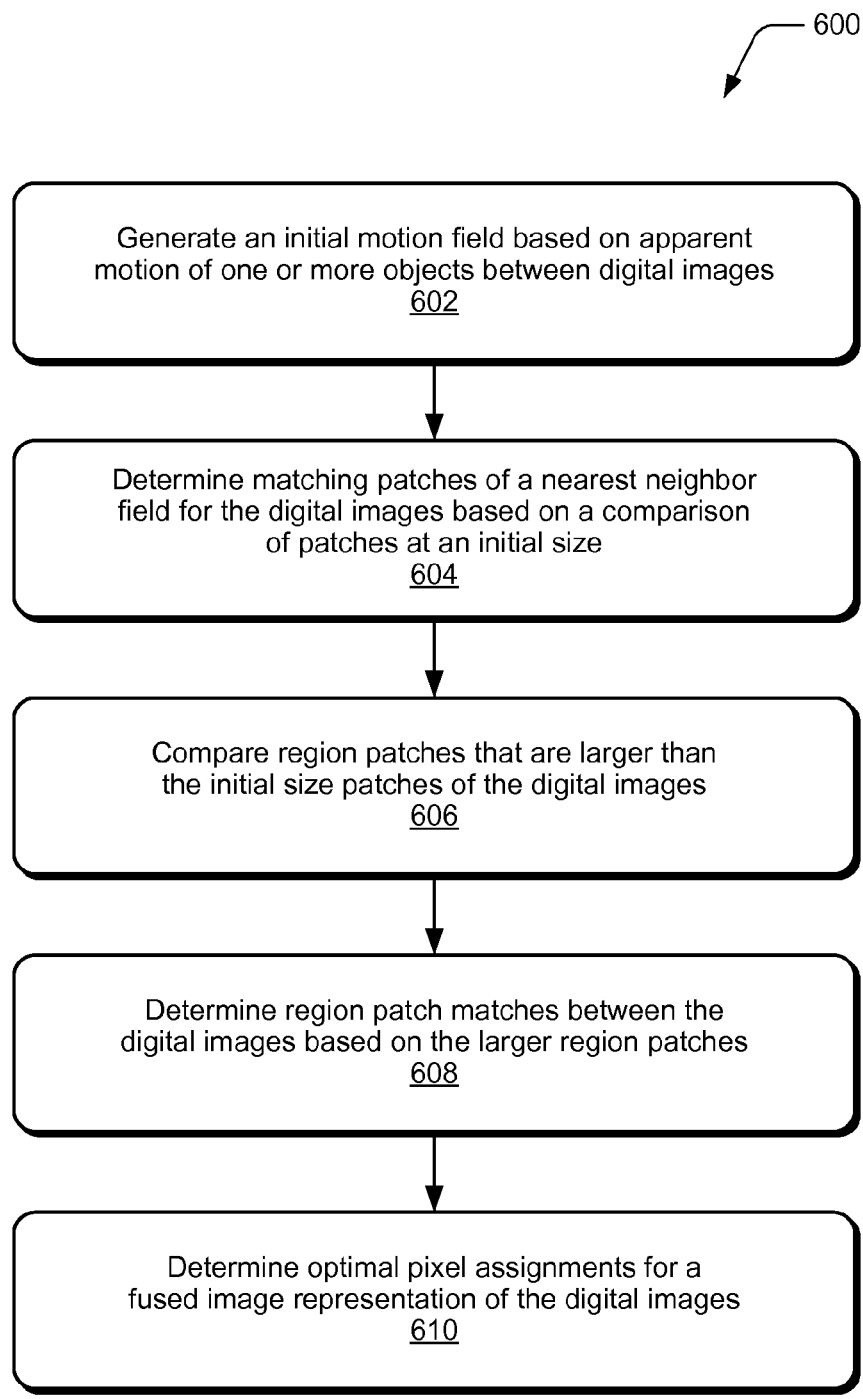
FIG. 6 illustrates example method(s) of optical flow with nearest neighbor field fusion in accordance with one or more embodiments.

FIG. 6 illustrates example method(s) 600 of optical flow with nearest neighbor field fusion, and is generally described with reference to an image processing application. The order in which the method is described is not intended to be construed as a limitation, and any number or combination of the method operations can be combined in any order to implement a method, or an alternate method.

At 602, an initial motion field is generated based on apparent motion of one or more objects between digital images. For example, the optical flow algorithm 108 of the image processing application 104 at the computing device 102 (FIG. 1) generates the initial motion field 120 (e.g., also shown as example motion field 202 in FIG. 2), which accounts for small displacements of the apparent motion of objects between the digital images, such as the first and second images 114, 116.

At 604, matching patches of a nearest neighbor field for the digital images are determined based on a comparison of patches of an initial size. For example, the nearest neighbor field algorithm 110 of the image processing application 104 compares patches of an initial size to determine matching patches of the nearest neighbor field 122 of the digital images. The nearest neighbor field accounts for large displacements of the apparent motion of objects between the digital images. The image processing application 104 can create the first image grid 304 (FIG. 3) of the first image 114 and create the second image grid 306 of the second image 116, and the nearest neighbor field algorithm 110 compares image patches in the first image grid 304 and the second image grid 306 to determine the matching patches (e.g., of the digital image data 118). The initial matching patches 302 are shown in FIG. 3 at the image grid locations of the first and second images 114, 116.

At 606, region patches that are larger than the initial size patches of the digital images are compared. For example, the nearest neighbor field algorithm 110 of the image processing application 104 compares region patches 406 (FIG. 4) to determine region patch matches between the digital images. The nearest neighbor field algorithm 110 compares different sizes (e.g., 3×3, 5×5, 7×7, etc.) of region patches 406 that are larger than the initial size matching patches of the nearest neighbor field. At 608, region patch matches between the digital images are determined based on the larger region patches. For example, the nearest neighbor field algorithm 110 determines the region patch matches 124 based on comparisons (at 606) of the larger region patches 406.

At 610, optimal pixel assignments are determined for a fused image representation of the digital images. For example, the fusion algorithm 112 of the image processing application 104 determines optimal pixel assignments for the fused image representation 502 (FIG. 5) of the digital images. The fused image representation of the digital images reflects both the large and small displacements of the apparent motion of the objects, such as between the first and second images 114, 116. The optimal pixel assignments are determined from the initial motion field 120 (e.g., also shown as example motion field 202), the matching patches 302 of the nearest neighbor field 122, and the region patch matches 124 (e.g., also shown as example region patches 406). The optimal pixel assignments are determined based on minimizing an energy function that assigns an optimal pixel selected based on the multiple labels that correspond to a pixel location. An optimal pixel assignment at each pixel location of the fused image representation is determined based on the multiple labels that correspond to a pixel location, where the multiple labels include the initial motion field at the pixel location, a matching patch at the pixel location, and one or more of the region patch matches that encompass the pixel location.

Figure 7:
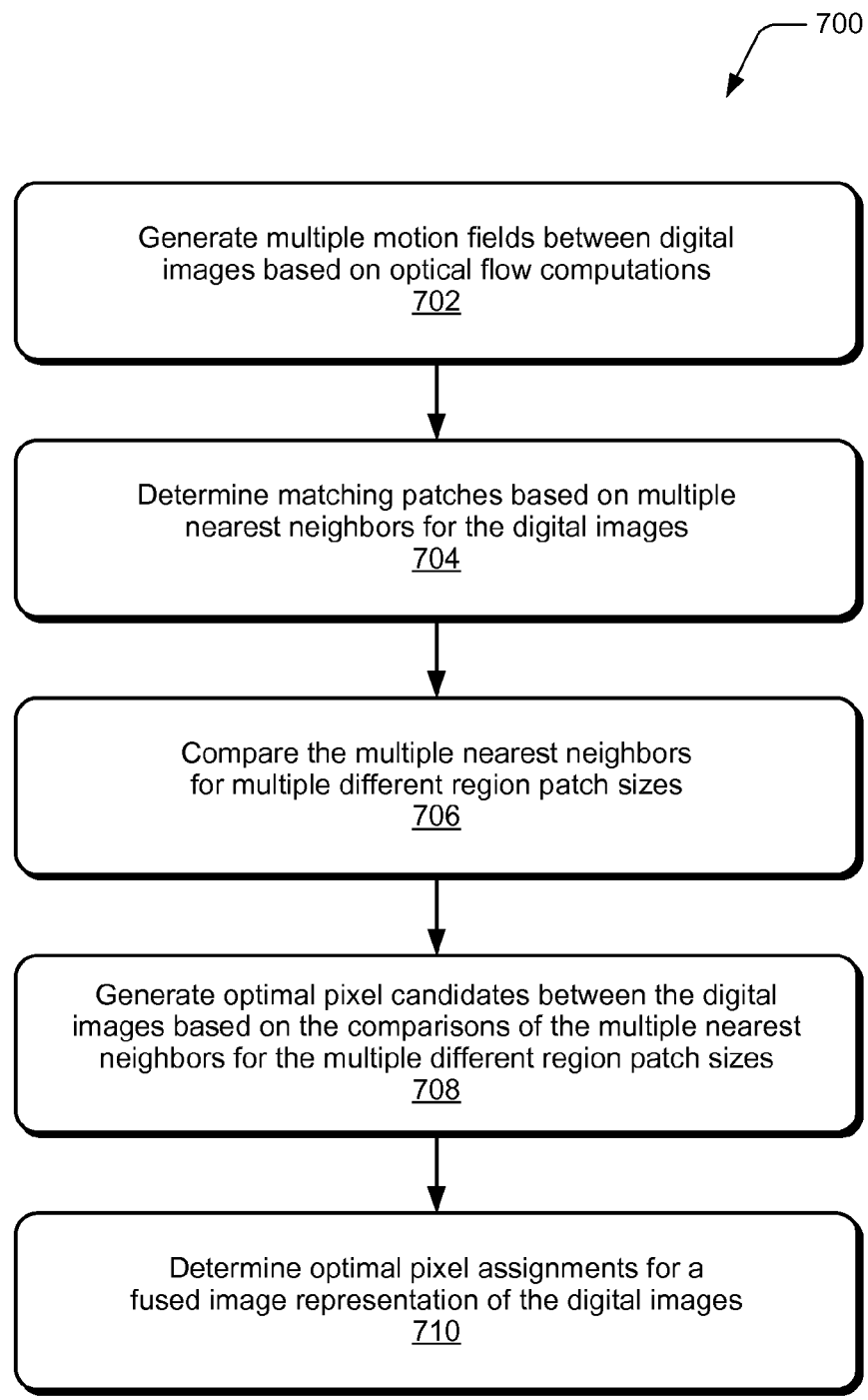
FIG. 7 illustrates example method(s) of optical flow with nearest neighbor field fusion in accordance with one or more embodiments.

FIG. 7 illustrates example method(s) 700 of optical flow with nearest neighbor field fusion, and is generally described with reference to an image processing application. The order in which the method is described is not intended to be construed as a limitation, and any number or combination of the method operations can be combined in any order to implement a method, or an alternate method.

At 702, multiple motion fields between digital images are generated based on optical flow computations of the apparent motion of one or more objects between the digital images. For example, the optical flow algorithm 108 of the image processing application 104 at the computing device 102 (FIG. 1) generates multiple motion fields (e.g., such as motion field 120 and the example motion field 202 in FIG. 2) based on optical flow computations which accounts for small displacements of the apparent motion of objects between the digital images, such as the first and second images 114, 116. Alternatively or in addition, more than one optical flow algorithm provide more than one local matching optimal pixel candidate based on the multiple motion fields.

At 704, matching patches based on multiple nearest neighbors for the digital images are determined. For example, the nearest neighbor field algorithm 110 of the image processing application 104 compares patches of an initial size to determine the matching patches based on multiple nearest neighbors (e.g., such as the nearest neighbor field 122) of the digital images. As described above, multiple global matching optimal pixel candidates are generated by computing a nearest neighbor field for each of the multiple different patch sizes, and the multiple nearest neighbors account for large displacements of the apparent motion of objects between the digital images.

At 706, the multiple nearest neighbors for multiple different region patch sizes are compared. For example, the nearest neighbor field algorithm 110 of the image processing application 104 compares the multiple nearest neighbors for multiple different region patch sizes (e.g., the region patches 406 (FIG. 4)) to determine region patch matches between the digital images. As described above, a factor of K nearest neighbors for m different patch sizes can be considered, which provides mK global matching candidates for the fusion algorithm. At 708, optimal pixel candidates between the digital images are generated based on the multiple nearest neighbors for the multiple different region patch sizes. For example, the nearest neighbor field algorithm 110 generates the optimal pixel candidates between the digital images 114, 116 based on the comparisons (at 706) of the multiple nearest neighbors for the multiple different region patch sizes.

At 710, optimal pixel assignments are determined for a fused image representation of the digital images. For example, the fusion algorithm 112 of the image processing application 104 determines the optimal pixel assignments for the fused image representation 502 (FIG. 5) of the digital images. The fused image representation of the digital images reflects both the large and small displacements of the apparent motion of the objects, such as between the first and second images 114, 116. The optimal pixel assignments are determined based on minimizing an energy function that assigns an optimal pixel selected based on the multiple labels that correspond to a pixel location, such as determined from the multiple motion fields, the matching patches of the multiple nearest neighbors, and from the optimal pixel candidates that are generated based the comparisons of the multiple nearest neighbors for the multiple different region patch sizes.

Figure 8:
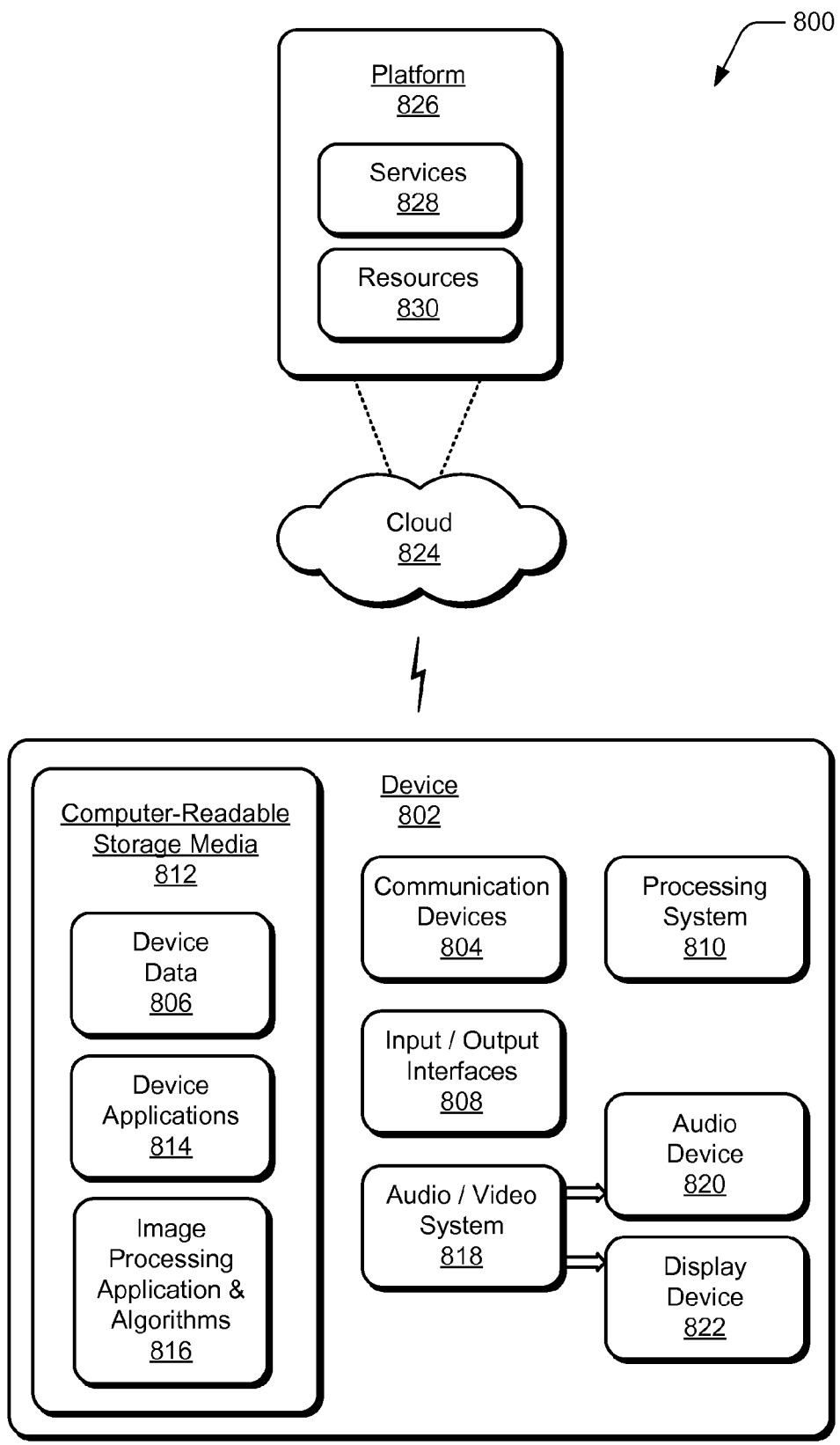
FIG. 8 illustrates an example system with an example device that can implement embodiments of optical flow with nearest neighbor field fusion.

FIG. 8 illustrates an example system 800 that includes an example device 802, which can implement embodiments of optical flow with nearest neighbor field fusion. The example device 802 can be implemented as any of the devices and/or servers described with reference to the previous FIGS. 1-7, such as any type of computer, server, processing device, client device, mobile device, tablet, computing, communication, and/or other type of device. For example, computing device 102 shown in FIG. 1 may be implemented as the example device 802.

The device 802 includes communication devices 804 that enable wired and/or wireless communication of device data 806, such as the digital images and the digital image data that is stored on the device. The communication devices 804 can also include transceivers for cellular phone communication and for network data communication.

The device 802 also includes input/output (I/O) interfaces 808, such as data network interfaces that provide connection and/or communication links between the device, data networks, and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage media 812, such as data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 812 provides storage of the device data 806 and various device applications 814, such as an operating system that is maintained as a software application with the computer-readable storage media and executed by the processing system 810. In this example, the device applications also include an image processing application and algorithms 816 that implement embodiments of optical flow with nearest neighbor field fusion, such as when the example device 802 is implemented as the computing device 102 shown in FIG. 1. Examples of the image processing application and algorithms 816 are the image processing application 104, the optical flow algorithm 108, the nearest neighbor field algorithm 110, and the fusion algorithm 112 at the computing device 102, as described with reference to FIGS. 1-7.

The device 802 also includes an audio and/or video system 818 that generates audio data for an audio device 820 and/or generates display data for a display device 822. The audio device and/or the display device include any devices that process, display, and/or otherwise render audio, video, display, and/or image data. In implementations, the audio device and/or the display device are integrated components of the example device 802. Alternatively, the audio device and/or the display device are external, peripheral components to the example device.

In embodiments, at least part of the techniques described for optical flow with nearest neighbor field fusion may be implemented in a distributed system, such as over a "cloud" 824 in a platform 826. The cloud 824 includes and/or is representative of the platform 826 for services 828 and/or resources 830. For example, the services 828 and/or the resources 830 may include any of the image processing application and algorithms 816, as well as the digital images 106 and the digital image data 118 described with reference to FIG. 1.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device embodiment with functionality distributed throughout the system 800. For example, the functionality may be implemented in part at the example device 802 as well as via the platform 826 that abstracts the functionality of the cloud 824.

Although embodiments of optical flow with nearest neighbor field fusion have been described in language specific to features and/or methods, the appended claims are not necessarily limited to the specific features or methods described. Rather, the specific features and methods are disclosed as example implementations of optical flow with nearest neighbor field fusion.

The invention claimed is:

1. A method, comprising:
  generating an initial motion field based on apparent motion of one or more objects between digital images;
  determining matching patches of a nearest neighbor field for the digital images;
  determining one or more region patch matches between the digital images based on the nearest neighbor field; and
  determining optimal pixel assignments for a fused image representation of the digital images, an optimal pixel assignment at each pixel location of the fused image representation determined based on multiple labels that correspond to a pixel location, the multiple labels including the initial motion field at the pixel location, a matching patch at the pixel location, and one or more of the region patch matches that encompass the pixel location.

2. A method as recited in claim 1, further comprising:
  comparing patches of an initial size to determine the matching patches of the nearest neighbor field; and
  comparing region patches that are larger than the initial size patches to determine the region patch matches between the digital images.

3. A method as recited in claim 1, wherein said determining the matching patches includes determining each of the matching patches based on multiple nearest neighbors of a matching patch, and wherein the multiple nearest neighbors of the matching patch are possible candidates that are determinable as the optimal pixel assignments.

4. A method as recited in claim 1, further comprising:
  generating multiple motion fields based on optical flow computations that contribute multiple possible candidates which are determinable as the optimal pixel assignments; and
  wherein the optimal pixel assignments are further determined based on the multiple motion fields.

5. A method as recited in claim 1, wherein the optimal pixel assignments are determined based on minimizing an energy function that assigns an optimal pixel selected based on the multiple labels that correspond to the pixel location.

6. A method as recited in claim 1, wherein:
  the initial motion field accounts for small displacements of the apparent motion of the one or more objects between the digital images;
  the nearest neighbor field accounts for large displacements of the apparent motion of the one or more objects between the digital images; and
  the fused image representation of the digital images reflects both the large and small displacements of the apparent motion of the one or more objects.

7. A method as recited in claim 1, wherein the fused image representation of the digital images represents fusing optical flow results that utilize local patch matching with dense nearest neighbor fields that utilize global patch matching.

8. A computing device, comprising:
  a memory configured to maintain digital images;
  a processing system to implement algorithms of an image processing application, the algorithms including:
  an optical flow algorithm configured to generate an initial motion field based on apparent motion of one or more objects between the digital images, and further configured to generate multiple motion fields based on optical flow computations that contribute multiple possible candidates which are determinable as optimal pixel assignments;
  a nearest neighbor field algorithm configured to determine matching patches and one or more region patch matches of a nearest neighbor field for the digital images; and
  a fusion algorithm configured to determine the optimal pixel assignments for a fused image representation of the digital images, the optimal pixel assignments determined from the initial motion field, the multiple motion fields, the matching patches, and the one or more region patch matches.

9. A computing device as recited in claim 8, wherein the nearest neighbor field algorithm is configured to:
  compare patches of an initial size to determine the matching patches of the nearest neighbor field; and
  compare region patches that are larger than the initial size patches to determine the region patch matches between the digital images.

10. A computing device as recited in claim 8, wherein the nearest neighbor field algorithm is configured to determine each of the matching patches based on multiple nearest neighbors of a matching patch, and wherein the multiple nearest neighbors of the matching patch are possible candidates that are determinable as the optimal pixel assignments.

11. A computing device as recited in claim 8, wherein the fusion algorithm is configured to determine the optimal pixel assignment at each pixel location of the fused image representation based on multiple labels that correspond to a pixel location, the multiple labels including the initial motion field at the pixel location, a matching patch at the pixel location, and one or more of the region patch matches that encompass the pixel location.

12. A computing device as recited in claim 11, wherein the fusion algorithm is configured to determine the optimal pixel assignments based on minimizing an energy function that assigns an optimal pixel selected based on the multiple labels that correspond to a pixel location.

13. A computing device as recited in claim 8, wherein:
   the optical flow algorithm is configured to generate the initial motion field to account for small displacements of the apparent motion of the one or more objects between the digital images;
   the nearest neighbor field algorithm is configured to generate the nearest neighbor field to account for large displacements of the apparent motion of the one or more objects between the digital images; and
   the fusion algorithm is configured to determine the optimal pixel assignments of the fused image representation to reflect both the large and small displacements of the apparent motion of the one or more objects.

14. A computing device as recited in claim 8, wherein the fused image representation of the digital images represents fusing optical flow results that utilize local patch matching with dense nearest neighbor fields that utilize global patch matching.

15. Computer-readable storage memory comprising executable instructions stored as algorithms and, responsive to execution of the instructions at a computing device, the computing device performs operations of the algorithms comprising to:
   generate an initial flow field based on apparent motion of one or more objects between digital images as represented by a displacement from a first digital image to a second digital image, the initial flow field generated to account for small displacements of the apparent motion of the one or more objects between the digital images;
   generate a nearest neighbor field to account for large displacements of the apparent motion of the one or more objects between the digital images;
   determine matching patches of the nearest neighbor field for the first and second digital images;
   determine one or more region patch matches between the first and second digital images based on the nearest neighbor field;
   determine optimal pixel assignments for a fused image representation of the first and second images, the optimal pixel assignments determinable from the initial flow field, the matching patches, and the one or more region patch matches.

16. Computer-readable storage memory as recited in claim 15, wherein the computing device performs the operations of the algorithms further comprising to:
   create image grids of the digital images;
   compare patches of an initial size defined by the image grids to determine the matching patches of the nearest neighbor field; and
   compare region patches that are larger than the initial size patches to determine the region patch matches between the digital images.

17. Computer-readable storage memory as recited in claim 15, wherein the computing device performs the operations of the algorithms further comprising to determine the optimal pixel assignments at each pixel location of the fused image representation based on multiple labels that correspond to a pixel location, the multiple labels including the initial flow field at the pixel location, a matching patch at the pixel location, and one or more of the region patch matches that encompass the pixel location.

18. Computer-readable storage memory as recited in claim 17, wherein the computing device performs the operations of the algorithms further comprising to determine the optimal pixel assignments based on minimizing an energy function that assigns an optimal pixel selected based on the multiple labels that correspond to the pixel location.

19. Computer-readable storage memory as recited in claim 15, wherein the computing device performs the operations of the algorithms further comprising to determine the optimal pixel assignments of the fused image representation to reflect both the large and small displacements of the apparent motion of the one or more objects.

20. Computer-readable storage memory as recited in claim 15, wherein the computing device performs the operations of the algorithms to determine the matching patches further comprising to determine each of the matching patches based on multiple nearest neighbors of a matching patch, wherein the multiple nearest neighbors of the matching patch are possible candidates that are determinable as the optimal pixel assignments.

* * * * *